Feb. 18, 1941.  A. G. WITT ET AL  2,232,420
CHEESE CUTTER
Filed Feb. 17, 1940   2 Sheets-Sheet 1
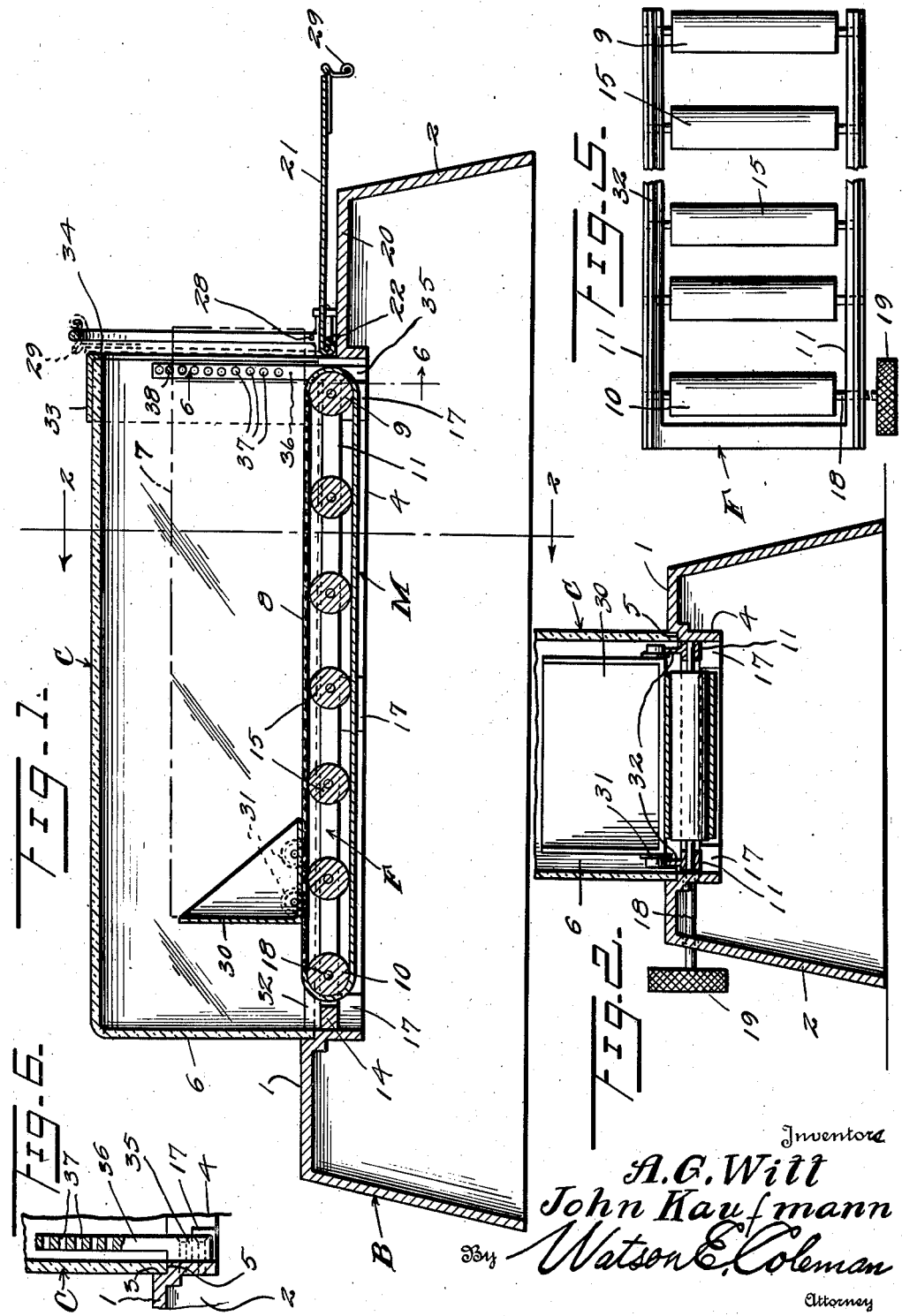
Inventors
A. G. Witt
John Kaufmann
By Watson E. Coleman
Attorney Feb. 18, 1941.　　A. G. WITT ET AL　　2,232,420
CHEESE CUTTER
Filed Feb. 17, 1940　　2 Sheets-Sheet 2
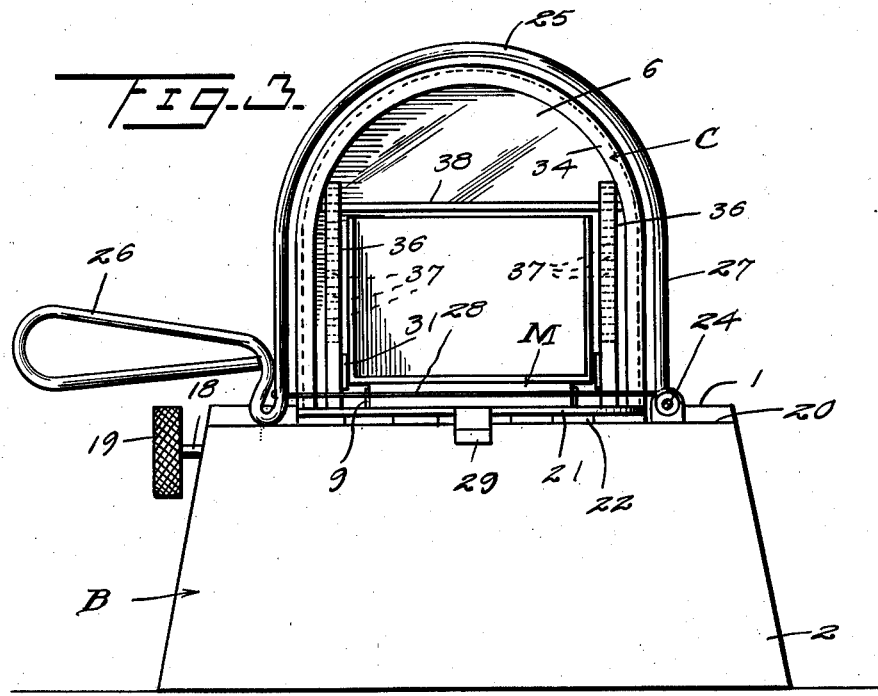
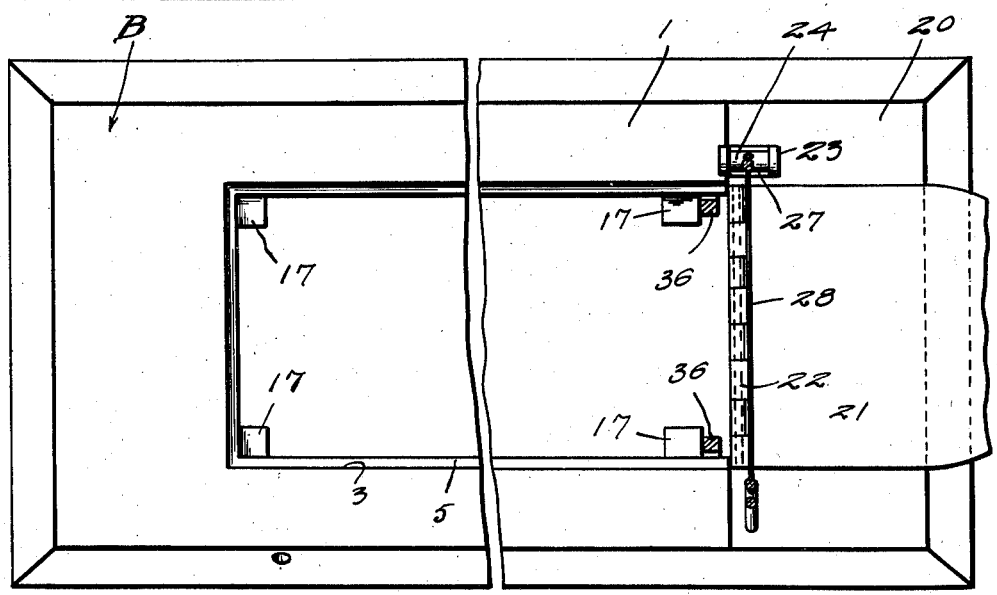
Inventors
A. G. Witt
John Kaufmann
By Watson E. Coleman
Attorney Patented Feb. 18, 1941

2,232,420

UNITED STATES PATENT OFFICE 2,232,420

CHEESE CUTTER

Arthur G. Witt and John Kaufmann,
Somerset, Pa.

Application February 17, 1940, Serial No. 319,525

5 Claims. (Cl. 31—20)

This invention relates to a cheese cutter, and it is an object of the invention to provide a device of this kind especially designed and adapted for use in connection with a cheese which is rectangular in cross section.

It is also an object of the invention to provide a cutter of this kind embodying means adjacent to the cutter whereby the slices as cut may be conveniently stacked and which means, when not in use, serves as a closure member for the housing which holds the cheese block to be sliced.

Another object of the invention is to provide a device of this kind including a cutter together with means for moving the cheese block toward the cutter and additional means adjacent to the cutter and coacting with the cheese block to effectively hold the cheese block to facilitate desired cutting or slicing.

The invention consists in the details of construction and in the combination and arrangement of the several parts of our improved cheese cutter whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein—

Figure 1 is a longitudinal vertical sectional view taken through a cheese cutter constructed in accordance with an embodiment of our invention;

Figure 2 is a transverse sectional view taken substantially on the line 2—2 of Figure 1;

Figure 3 is a view in front elevation of the device as illustrated in Figure 1;

Figure 4 is a fragmentary view in top plan of the cutter as herein embodied;

Figure 5 is a view in top plan of the supporting means for the endless conveyor as herein comprised;

Figure 6 is a fragmentary detailed sectional view taken substantially on the line 6—6 of Figure 1.

As disclosed in the accompanying drawings, B denotes a base member preferably a metal casting and which comprises a top or bed plate 1 and the depending marginal flanges 2. These flanges 2 are of such dimensions to elevate the bed plate 1 from the supporting surface upon which the device is rested as may be preferred. The central portion of the bed plate 1 is provided with a long and wide rectangular opening 3 which is defined by the depending flanges 4.

The bed plate 1 immediately adjacent to the opening 3 is formed to provide the rabbet 5 extending along all sides of the opening 3 and which is adapted to snugly receive the lower marginal portions of the side walls 6 of a cover member C of glass or other material through which visual access may be readily had to the interior of the cover member. This cover member C is of a length coextensive in length with the opening 3 and one end of the cover member C is open.

The cover member C may be readily applied or removed with respect to the base member B and is of such dimensions as to house the cheese to be cut and which cheese, as herein disclosed, is in the form of an elongated block indicated by broken lines at 7 in Figure 1, and which block is preferably rectangular in cross section although we do not wish to be understood as limiting ourselves in this respect. The block 7 is placed upon the upper stretch 8 of an endless belt M and which belt is operatively engaged around the end rollers 9 and 10. These rollers 9 and 10 are rotatably supported between the side members 11 of a substantially U-shaped frame F. This frame F substantially snugly fits within the opening 3 particularly within the field defined by the flanges 4.

The free ends of the side members 11 of the frame F terminate closely adjacent to the forward end of the device or adjacent to the open end of the applied cover member C. The rear or opposite end portions of the members 11 are tied or connected by the transverse or intermediate member 14.

The side members 11 between the rollers 9 and 10 and at spaced points along the members 11 rotatably support the rollers 15 with which contact the upper stretch of the member M. The frame F rests upon inwardly disposed lugs 17 positioned adjacent the opposite ends of the opening 3 and which lugs are preferably cast with the flanges 2 of the base member B.

The frame F is readily applied or removed when desired and one of the end rollers, as 10, is mounted for rotation upon a removable shaft 18. The shaft 18 is of a length to have one end portion thereof extend out beyond an adjacent side flange 2 comprised in the base member and said extended portion has fixed thereto an operating head or knob 19 to provide means whereby the roller 10 may be manually rotated to cause the upper stretch 8 of the member M to move forwardly or toward the open end of the applied cover member C so as to feed the cheese block 7 forwardly during a cutting or slicing operation.

In the present embodiment of our invention the shaft 18 is adapted to be endwise moved into proper position and through the roller 10, although other arrangements may be employed, it only being required that provision be made whereby the end roller 10 can be conveniently rotated.

The portion 20 of the bed plate 1 in advance of the opening 3 is dropped down a slight distance below the bed plate 1 proper to accommodate the closure member 21 for the front or open end of the cover member C and when said closure member 21 is in lowered position. This closure member 21 is flat and of a configuration approximating the form of the open end of the cover member C. One end portion of the closure member 21 is hingedly connected, as at 22, with the forward bed portion 20 at a point immediately adjacent the forward end of the opening 3. This mounting of the closure member 21 allows the same to be swung upwardly into closed position and, of course, with equal facility to be swung downwardly into open position.

Adjacent to the forward end of the opening 3 the bed plate 1 and the forward plate portion 20 are provided the upstanding lugs 23 spaced apart in a direction lengthwise of the base member B and between which is pivotally mounted, as at 24, an end portion of a cutter frame 25. As herein disclosed, the cutter frame 25 is in the form of an inverted "U" and of such dimensions as to be positioned outwardly of the cover member C when at the limit of its cutting or slicing movement, as particularly illustrated in Figure 3. The end portion of the frame 25 remote from its pivotal mounting 24 is continued to provide an outwardly disposed and laterally directed handle member 26 whereby the frame 25 may be readily oscillated to effect the desired slicing or cutting operations. The frame 25 has interposed between and suitably connected to the outer extremities of its side arms 27 the cutting element 28 herein disclosed as a wire strand of required gauge and strength.

When the device is not in use the cutter frame 25 is in its lowered position as illustrated in Figures 1 and 3. Before being adjusted to such position the closure member 21 is raised into closed position as illustrated by broken lines in Figure 1. With the closure member 21 in its closed position and the frame 25 in its lowered position, a spring latch 29 carried by the outer end portion of the closure member 21 and substantially at the transverse center thereof is frictionally engaged with the intermediate portion of the frame 25 whereby the lowered frame 25 provides an effective means for maintaining the closure member 21 in its raised or closed position.

When it is desired to use the device, the frame 25 is swung upwardly and the cutting wire 28 passed around or over the latch 29 whereupon the closure member 21 is swung downwardly as indicated in Figure 1, to provide a tray to receive the slices of cheese as cut and in a manner whereby such slices will be stacked.

Suitably mounted upon the upper stretch 8 of the belt M is a follower 30 of such construction as to receive the lower rear portion of the cheese block 7. This follower 30 is provided at its opposite sides at the lower portion thereof with flanged wheels 31 which ride upon the upstanding flanged tracks 32 carried by the side members 11 of the frame F and extending along said side members 11 from one extremity to the other.

The forward or front end portion of the cover member C, as herein disclosed, is straddled by a tightly fitting yoke 33 of metal or other preferred material. The outer marginal portion of this yoke 33 is formed to provide an inwardly disposed flange 34 which overlies the adjacent end edge of the cover member C.

During a slicing operation it is important that the forward portion of the cheese block be held against any tendency of upward movement and particularly by the resulting action when raising the knife. The flanges 4 immediately adjacent the forward end of the opening 3 have suitably secured thereto, as at 35, the lower end portions of the upstanding posts 36. As is clearly illustrated in the accompanying drawings, these posts 36 are so positioned and arranged as to offer no hindrance or obstruction to the cheese block 7 as it is moved outwardly. The posts 36 are provided with the longitudinally spaced openings 37 through which is adapted to be selectively disposed a cross bar 38. This cross bar 38 as is illustrated in Figure 1 is placed above the cheese block 7 but in close proximity thereto, thus preventing said forward end portion of the block 7 from having upward displacement but, on the contrary, to be maintained at all times in proper position to assure the desired slicing.

From the foregoing description it is thought to be obvious that a cheese cutter constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A slicing machine comprising a base member including a bed plate having an elongated opening and a flange defining said opening, lugs extending inwardly from the flange, a frame fitting within the opening and resting upon the lugs, an endless member carried by the frame, means for moving said endless member, a follower moving with the upper stretch of the endless member, a cover member supported by the bed plate and disposed over the opening therein, one end of the cover member being open, and a cutting knife pivotally engaged with the bed plate to one side of the opening and closely adjacent to the open end of the applied cover member, said knife having swinging movement entirely across the open end of the casing.

2. A slicing machine comprising a base member including a bed plate having an elongated opening and a flange defining said opening, lugs extending inwardly from the flange, a frame fitting within the opening and resting upon the lugs, an endless member carried by the frame, means for moving said endless member, a follower moving with the upper stretch of the endless member, a cover member supported by the bed plate and disposed over the opening therein, one end of the cover member being open, a cutting knife pivotally engaged with the bed plate to one side of the opening and closely adjacent to the open end of the applied cover member, said knife having swinging movement entirely across the open end of the casing, and means carried by the base member at opposite sides of the opening and adjacent to the open end of the applied cover member for holding the material to be sliced against movement away from the bed plate but offering no obstruction to the movement of such material toward the knife.

3. A slicing machine comprising a base member including a bed plate having an elongated opening and a flange defining said opening, lugs extending inwardly from the flange, a frame fitting within the opening and resting upon the lugs, an endless member carried by the frame, means for moving said endless member, a follower moving with the upper stretch of the endless member, a cover member supported by the bed plate and disposed over the opening therein, one end of the cover member being open, a cutting knife pivotally engaged with the bed plate to one side of the opening and closely adjacent to the open end of the applied cover member, said knife having swinging movement entirely across the open end of the casing, posts carried by the base member at the extremity of the opening adjacent the open end of the applied cover member, said posts extending upwardly within the applied cover member, and a cross bar selectively engaged with the posts at points lengthwise thereof to extend across the material to be sliced to hold such material against movement away from the bed plate.

4. A slicing machine comprising a base member including a bed plate having an elongated opening and a flange defining said opening, lugs extending inwardly from the flange, a frame fitting within the opening and resting upon the lugs, an endless member carried by the frame, means for moving said endless member, a follower moving with the upper stretch of the endless member, a cover member supported by the bed plate and disposed over the opening therein, one end of the cover member being open, a cutting knife pivotally engaged with the bed plate to one side of the opening and closely adjacent to the open end of the applied cover member, said knife having swinging movement entirely across the open end of the casing, a closure member for the open end of the applied cover member, and means for hingedly connecting an end portion of the closure member to the bed plate of the base member, said closure member swinging upwardly into closed position and downwardly into open position, said closure member being so constructed and formed to provide a tray upon which is received the material for being sliced.

5. A slicing machine comprising a base member including a bed plate having an elongated opening and a flange defining said opening, lugs extending inwardly from the flange, a frame fitting within the opening and resting upon the lugs, an endless member carried by the frame, means for moving said endless member, a follower moving with the upper stretch of the endless member, a cover member supported by the bed plate and disposed over the opening therein, one end of the cover member being open, a cutting knife pivotally engaged with the bed plate to one side of the opening and closely adjacent to the open end of the applied cover member, said knife having swinging movement entirely across the open end of the casing, a closure member for the open end of the applied cover member, means for hingedly connecting an end portion of the closure member to the bed plate of the base member, said closure member swinging upwardly into closed position and downwardly into open position, said closure member being so constructed and formed to provide a tray upon which is received the material for being sliced, the knife providing means, when the knife is in its lowered position, to hold the closure member in its closed position.

ARTHUR G. WITT.
JOHN KAUFMANN.